United States Patent

[11] 3,609,232

[72] Inventor Joseph Edward Thomas
Batavia, N.Y.

[21] Appl. No. 34,482
[22] Filed May 4, 1970
[45] Patented Sept. 28, 1971
[73] Assignee Sylvania Electric Products Inc.
Continuation-in-part of application Ser. No. 690,146, Dec. 13, 1967.

[54] TRANSISTORIZED CONTROL CIRCUITRY FOR TELEVISION RECEIVER
10 Claims, 5 Drawing Figs.

[52] U.S. Cl. .......... 178/7.3, 325/319, 325/397, 325/411
[51] Int. Cl. .......... H04n 5/10
[50] Field of Search .......... 178/7.3, 7.3 S, 6 NS, 7.5 S; 330/94; 307/295; 325/319, 397, 411

[56] References Cited
UNITED STATES PATENTS
2,261,619 11/1941 Foster .......... 330/94

*Primary Examiner*—Benedick V. Safourek
*Assistant Examiner*—Anthony H. Hanoal
*Attorneys*—Norman J. O'Malley, Robert E. Walrath and Thomas H. Buffton

ABSTRACT: Transistorized automatic gain control and sync separator circuitry which increases the input impedance of the sync separator at high frequencies, such as random noise condition, and prevents loss of sync under conditions of high random noise level. The increased sync separator impedance at high frequency noise level is accomplished without any high frequency loading of the video amplifier from which the sync separator signal is obtained.

PATENTED SEP 28 1971 3,609,232

SHEET 1 OF 2

PATENTED SEP 28 1971 3,609,232

INVENTOR.
JOSEPH E. THOMAS

BY

Robert E. Walrath

ATTORNEY

TRANSISTORIZED CONTROL CIRCUITRY FOR TELEVISION RECEIVER

CROSS-REFERENCE TO RELATED APPLICATION

This application is a continuation-in-part of the copending application of Joseph Edward Thomas, Ser. No. 690,146, filed Dec. 13, 1967 now U.S. Pat. No. 3,548,097, and now assigned to the same assignee as the present invention.

BACKGROUND OF THE INVENTION

In the television art, it is well known that electron beam movement in the camera at the transmitter must be exactly synchronized with the picture tube or display device at the receiver so that the scene viewed by the camera is faithfully reproduced at the receiver. This is accomplished by including synchronization and control pulses with the composite video signal, which pulses are operative in the receiver to synchronize the scan of the display tube with the scanning that has been affected at the transmitter. At the receiver, the control pulses are separated from the composite video signal by means of a sync separator circuit which transmits these pulses to suitable control circuitry in the receiver to effect the desired synchronized scanning of the receiver display device.

At the receiver antenna the strength of the intercepted signal may vary significantly for numerous uncontrollable reasons and thus the synchronizing pulses and composite video signal may also vary in amplitude to a considerable extent. Therefore, the receiver will include automatic gain control circuitry (AGC) operative in a manner such that the strength of the signal applied to the picture tube or display device remains substantially constant regardless of the strength of the received signal. In addition, the AGC is operative to prevent the composite video signal, and hence the synchronizing pulses contained therein, from exceeding predetermined excursion levels.

Along with the composite video signal received at the antenna of the receiver, there frequently occur random noise pulses often having an amplitude greater than that of the synchronizing pulses contained therein. Moreover, the sync separator circuitry and the AGC circuitry are dependent upon the amplitude of the synchronizing pulses for correct operation. In general, these random noise signals, or spikes, occur at a frequency level significantly higher than the level of the synchronizing pulses. One technique for diminishing the effect of random noise pulses on a sync separator circuit is to connect a gate transistor in series with the sync separator circuit, wherein the transistor is biased in saturation for signal amplitudes not exceeding that of the sync pulses. However, when the amplitude of the random noise pulses is greater than that of the sync pulses applied to the sync separator circuitry, the gate transistor is cut off to thereby prevent conduction of the sync separator device and discharge of the sync-biasing network. This has proved effective for noise pulses which exceed the amplitude of the synchronization pulses, but is ineffective to control noise pulses which are lower or equal in amplitude to the synchronization pulses.

The problem of reducing the effect of random noise on sync separator circuitry and hence the receiver operation is further compounded in receivers that use transistorized sync separator means which operate with relatively low amplitude composite video signal voltages. Because of the low level sync pulses contained in such composite video signals, there is not a very large range of sync pulse amplitude which can be used to control the gating of the sync separator. Furthermore, the transistor is effectively a low impedance device compared to the impedance of a comparable electron tube. It is, therefore, difficult to filter the random noise signal at the input of the transistorized sync separator since this type of a filtering network results in a high frequency loading of the video amplifier circuitry, thereby diminishing the gain of such circuitry for the relatively high frequency signals contained in the composite video signal.

One method of attacking the random noise problem in transistorized circuitry is to provide a multiple stage sync separator network which permits filtering in between the various stages of amplification of the sync separator network without adversely affecting the video amplifier. However, this solution is undesirable because it adds extra components to the system and hence adversely affects the cost of the system.

OBJECTS AND SUMMARY OF THE INVENTION

Accordingly, it is a principal object of this invention to provide improved sync separator circuitry which overcomes the foregoing deficiencies of the prior art.

Another object of the present invention is to provide highly noise-immune transistorized sync separator circuitry which does not result in high frequency loading of the video amplifier circuitry.

Still another object of the invention is to provide transistorized sync separator circuitry having high noise immunity, yet being economical in design and reliable in operation.

According to one aspect of the invention, the composite video signal including the synchronization pulses are derived from one stage of the video amplifier and applied to the base of a sync separator transistor. The transistor is biased to be nonconducting for pulses which are less than the minimum synchronization pulse level and is further biased to clamp in saturation when synchronization pulses are applied thereto. Taking advantage of the current characteristics of the transistor, a device having maximum impedance at higher frequencies, such as a choke, is connected in series with the emitter terminal of the transistor to thereby provide a high impedance to the random noise signal pulses which are encountered at the base of the sync separator transistor. The value of the choke is chosen to pass the lower frequency control pulses at full gain, but to attenuate the higher frequency random noise pulses.

DESCRIPTION OF THE PREFERRED EMBODIMENTS

For a better understanding of the present invention, together with other and further objects, advantages, and capabilities thereof, reference is made to the following disclosure and appended claims in connection with the above described drawings.

Figure 1:
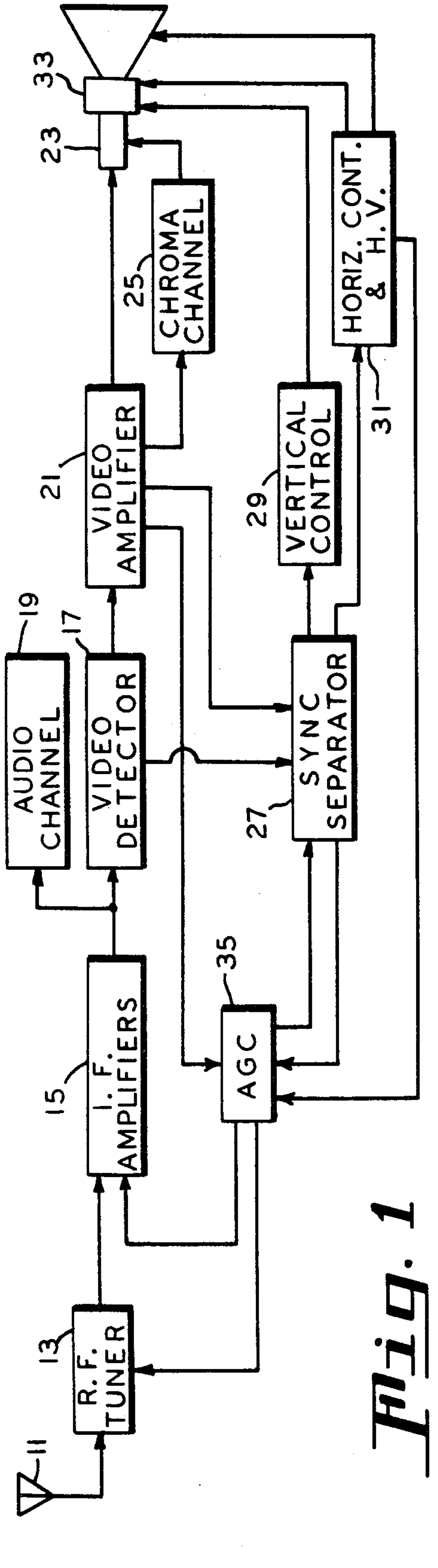
FIG. 1 is a block diagram of a television receiver in which the present invention finds utility.

Referring now to the block diagram of FIG. 1, the modulated RF signal from the antenna 11 is applied to the RF tuner amplifier circuitry 13 wherein the carrier is heterodyned down to the intermediate frequency applied to the IF amplifiers 15. The output from the IF amplifiers is applied to the video detector 17 and to the audio channel 19 wherein the audio signal component is suitably processed to reproduce the sound portion of the signal. The video detector strips the IF carrier from the composite video signal and the output of the detector is applied to the video amplifier 21. In the video amplifier, the luminance portion of the composite video signal is detected and applied to the cathode-ray tube delay device 23 and the chrominance components of the composite video signal are applied from the video amplifier to the chroma channel 25 where they are suitably processed and thence applied to the cathode-ray tube. In addition, an output from the video amplifier goes to the sync separator circuitry 27 which separates the synchronization pulses from the composite video signal and applies these pulses to the vertical 29 and horizontal control circuitry 31. The outputs from the vertical and horizontal control circuitry are applied to deflection apparatus 33 mounted on the neck of the cathode-ray tube 23 to provide synchronized scanning of the cathode-ray tube. A portion of the horizontal control signal generated is used to produce the high voltage necessary for the cathode-ray tube, and, in addition, from the high voltage circuitry a signal is returned to the automatic gain control network 35. The AGC network also received signal inputs from the video amplifier and the video detector via the sync separator, and generates gain control signals which are applied to the RF tuner and the IF amplifiers to provide a constant signal output, thereby producing a uniform reproduction of the received signal even though there may be variations in received signal strength.

Figures 2, 4, 5:
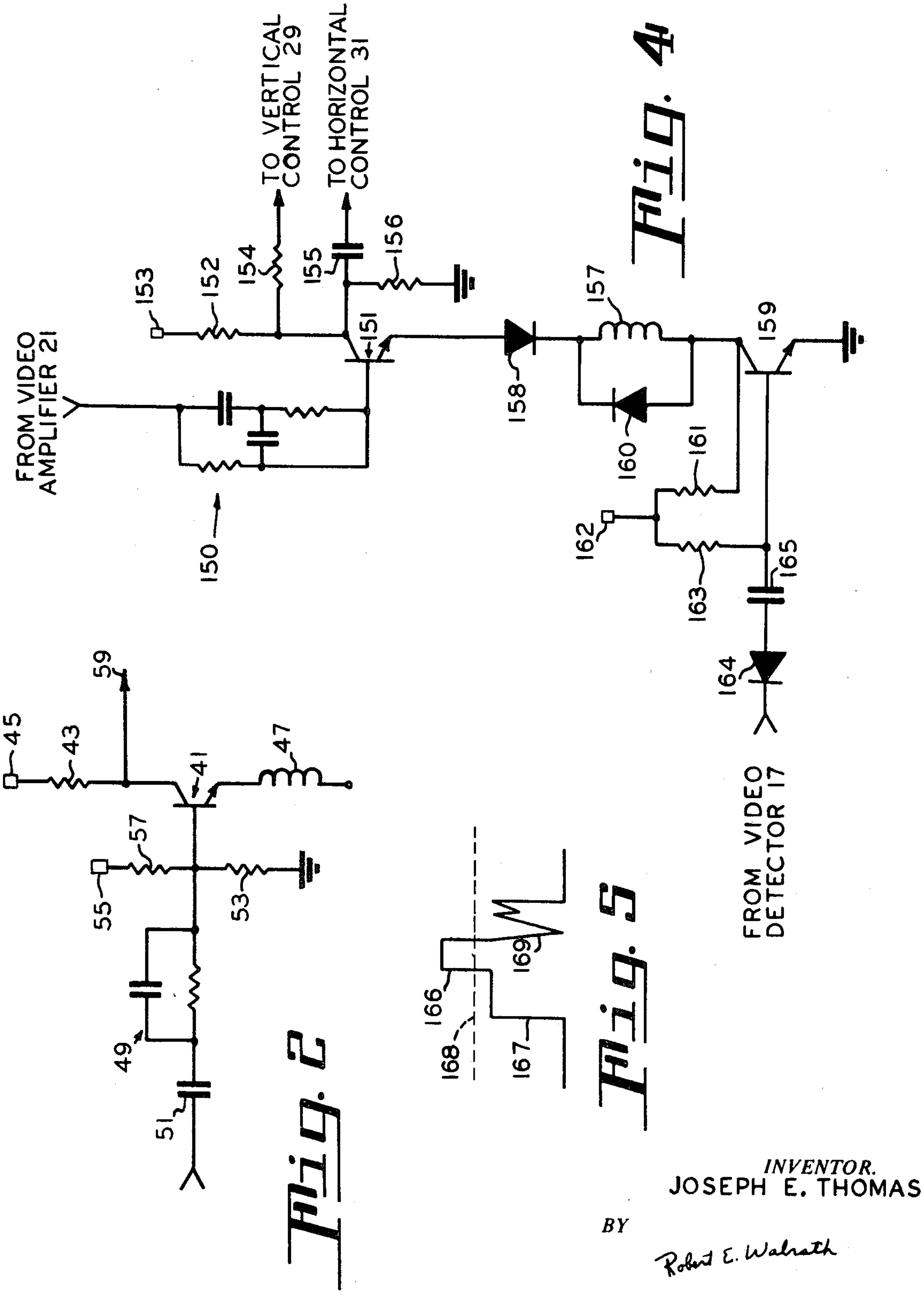
FIG. 2 is a schematic circuit diagram of a sync separator circuit according to the present invention.
FIG. 4 is a schematic circuit diagram of an alternate embodiment of a sync separator circuit according to the present invention.
FIG. 5 is a waveform diagram to aid in explaining FIG. 4.

Referring next to FIG. 2, one embodiment of a sync separator circuit according to the present invention consists of a transistor 41 having its collector electrode connected via a resistor 43 to a source of energizing potential as represented by the terminal 45. An inductor 47 is connected in series with the emitter electrode of the transistor, and a parallel RC network 49 is connected in series with a capacitor 51 between an input terminal and the base of the transistor. The base of the transistor 41 is also connected to ground via a resistor 53 and to a source of bias potential, as represented by the terminal 55, by means of a resistor 57. The circuit output 59 is taken from the collector electrode of the transistor.

In operation, the circuit receives the composite video signal from the video amplifier in the receiver and separates the sync pulses therefrom, applying the sync pulse output at terminal 59 through suitable output circuitry to the horizontal and vertical control circuits. The bias network consisting of resistors 53 and 57 connected between the source of bias potential 55 and ground to the base of the transistor, bias the transistor to be nonconducting when the incoming composite video signal level is less than the predetermined sync level. When a sync pulse appears at the input, the sync pulse amplitude overcomes the reverse bias on the base-to-emitter junction of the transistor, and the transistor rapidly goes into saturation. During the conduction cycle, the capacitor 51 becomes negatively charged so that, at the end of the sync pulse, this capacitor provides a negative bias which helps to maintain the cutoff condition of the transistor 41. The discharge time constant is chosen such that the capacitor 51 retains a sufficiently negative potential in the period between adjacent sync pulses. A problem arises when noise pulses appear between adjacent synchronization pulses. The noise pulses tend to discharge the capacitor 51 and render the transistor 41 conducting. If this occurs, the clipping level of the sync separator transistor is altered, the lower level video information will be passed through, thereby providing false output sync signals adversely affecting the CRT display. However, taking cognizance of the fact that the transistor is essentially a current-sensitive device and that the noise pulses which appear are of a relatively high frequency, by placing the inductor 47 in series with the emitter electrode, these high frequency noise pulses are the base of the transistor see an effective impedance equaling the beta of the transistor times the value of the inductance 47. Therefore, there is no more than minimal conduction of the transistor 41 during the occurrence of a high frequency noise pulse, thereby retaining the appropriate charge on the bias capacitor 51.

Figure 3:
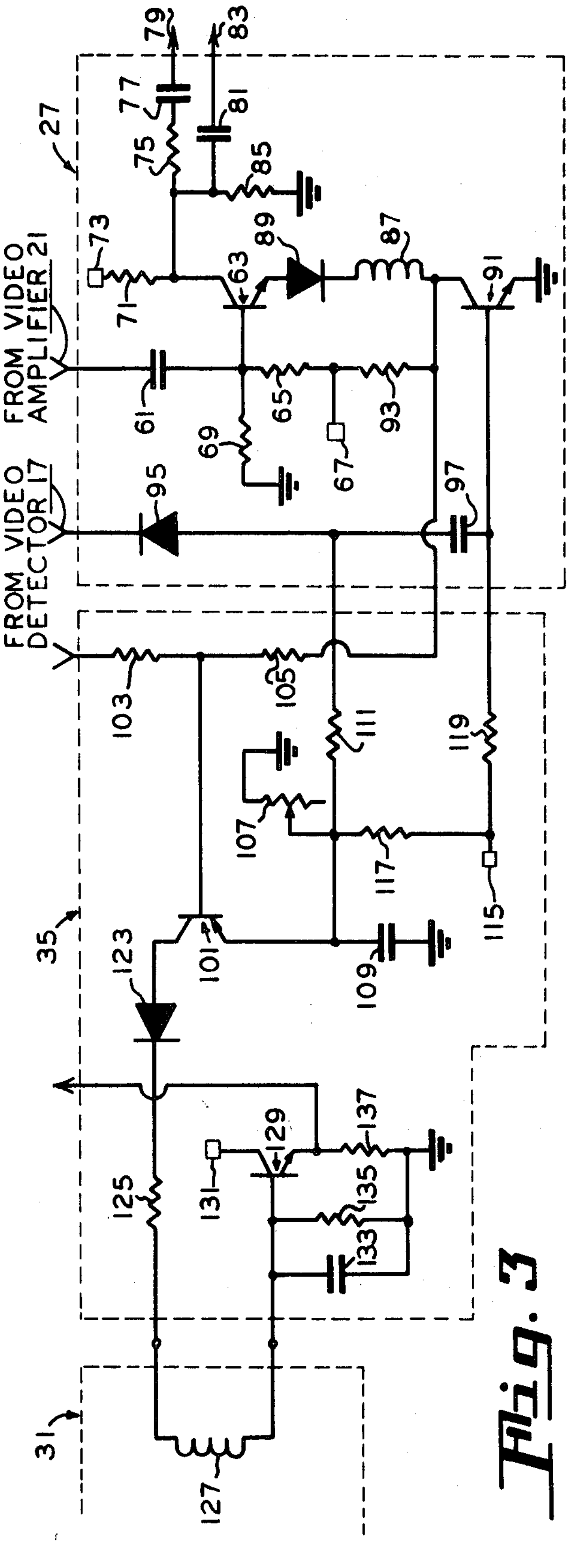
FIG. 3 is a schematic circuit diagram of sync separator circuitry and AGC circuitry according to the present invention.

A modified version of the sync separator circuit of FIG. 2 is illustrated in FIG. 3, as used in conjunction with an automatic gain control circuit. The sync separator circuit 27 receives the input form the video amplifier 21, which is coupled via a capacitor 61 to the base of the sync separator transistor 63. The base of the transistor is connected via a resistor 65 to a source of bias potential 67, and is also connected via a resistor 69 to a point of reference potential, such as ground. The collector electrode is connected via a resistor 71 to a source energizing potential 73, and is additionally connected through a resistor 75 in series with a capacitor 77 to an output terminal 79, going to the vertical control circuitry. The collector electrode is also connected via a capacitor 81 to output terminal 83 going to the horizontal control circuitry and is connected to ground by a resistor 85. An inductor 87 in series with a diode 89 is connected between the emitter electrode of the sync transistor 63 and the collector electrode of a noise gate transistor 91. The collector electrode of the noise gate transistor 91 is also connected via a resistor 93 to the source of bias potential 67. An input from the video detector 17 is coupled via a diode 95 in series with a capacitor 97 to the base electrode of the gate transistor 91.

The keyed automatic gain control circuit 35 includes a gate transistor 101 connected having its base electrode connected via a resistor 103 to an input from the video amplifier 21 and via a resistor 105 to the collector electrode of the gate transistor 91 of the sync separator 27. The emitter electrode of the AGC gate transistor is connected to the center tap of a bias potentiometer 107 and is also connected to ground via a capacitor 109. A resistor 111 is connected between the center tap of potentiometer 107 and the junction of the diode 95 and capacitor 97 in the sync separator 27. The emitter electrode of the transistor 101 is additionally connected to a source of bias potential 115 via a resistor 117, this bias potential also being connected via a resistor 119 to the base electrode of the aforementioned noise gate transistor 91 of the sync separator 27. The collector electrode of the transistor 101 is connected via a diode 123 in series with a resistor 125 through a winding 127 in the horizontal control circuitry 31 to the base electrode of an AGC amplifier transistor 129. The collector electrode of the amplifier transistor 129 is connected to a source of energizing potential as represented by the terminal 131. The base electrode of the transistor 129 is connected to ground by means of a capacitor 133 in parallel with a resistor 135, and the emitter electrode is connected to ground via a resistor 137. The output from the automatic gain control circuit 35 is taken from the emitter electrode of the transistor 129 and applied to the RF and IF amplifiers of the receiver as required.

The sync separator circuitry 27 of FIG. 3 operates in essentially the same manner as the circuit of FIG. 2. In addition, the noise gate transistor 91 is operative to prevent conduction of the sync separator transistor on the noise pulses having amplitudes greater than the sync pulse amplitude. The transistor 91 is biased to saturation for signals having amplitudes which do not exceed the established sync pulse amplitude. When high level noise pulses occur in the composite video signal, they appear of positive polarity at the input terminal coupled via the capacitor 61 to the base of the sync separator transistor 63 and will tend to turn this transistor on and drive it into saturation. However, in time coincidence with the positive polarity noise pulse applied to the base of transistor 63, there occurs the same noise signal but of negative polarity form the video detector coupled via the diode 45 and capacitor 97 to the base of the gate transistor 91. This negative noise pulse turns the gate transistor 91 off, raising the positive potential at its collector electrode and hence at the emitter electrode of the sync separator transistor 63, thereby increasing the reverse bias on the base-to-base emitter junction, which prevents the high level noise pulse from turning on the sync separator circuit.

The keyed AGC circuit 35 of FIG. 3 operates in a relatively straightforward manner utilizing the amplitude of the synchronizing pulses to establish the automatic gain control level.

A negative composite video signal from the video amplifier is coupled via the resistor 103 to the base of the AGC transistor 101. The transistor 101 conducts only when a sync pulse of sufficient amplitude (negative) is applied to its base and coincidentally a retrace pulse is coupled to the collector of the transistor from the horizontal control circuitry 31, i.e., by transformer coupling from the flyback transformer. When two such pulses appear in time coincidence, the sync pulse is coupled to the base of the AGC amplifier transistor 129 causing the transistor to conduct in proportion to the amplitude of the sync pulse. This, in turn, charges the capacitor 133 to provide a bias on the amplifier transistor 129 which remains relatively constant between successive sync pulses, and the AGC voltage is taken from the emitter electrode across the resistor 137 and applied to the selected RF or IF amplifier stages.

Referring next to FIG. 4, there is shown an alternate embodiment of a sync separator circuit according to the present invention. An output of video amplifier 21 is coupled via a biasing means or network 150 to an input electrode such as a base of semiconductor device such as a transistor 151. An output electrode such as a collector of transistor 151 is connected via a resistor 152 to a source of energizing potential represented by a terminal 153, by a resistor 154 to vertical control 29, and by a capacitor 155 to horizontal control 31. The collector of transistor 151 is further connected to ground by a resistor 156. A frequency-dependent impedance means such as an inductor 157 is connected in series with a diode 158 between an input electrode such as an emitter of transistor 151 and the collector electrode of a noise gate transistor 159. A means for suppressing ringing of inductor 157 such as a diode 160 is connected in parallel with inductor 157. The collector of transistor is further connected via a resistor 161 to a source of bias potential represented by a terminal 162 which is further connected via a resistor 163 to a base electrode of transistor 159. An emitter electrode of transistor 159 is connected to ground. A signal from video detector 17 is coupled via s diode 164 and a capacitor 165 to the base of transistor 159.

The operation of the sync separator circuit of FIG. 4 is essentially the same as the operation of the same portion of FIG. 3. In some cases in a circuit such as is disclosed in FIG. 3, the inductor may ring or oscillate when the sync pulse ends thereby improperly switching the sync separator transistor. This improper operation is illustrated in FIG. 5 wherein a sync pulse 166 is illustrated riding on a blanking pulse 167. The sync separator clipping level is illustrated by dashed line 168. When sync pulse 166 ends, transistor 151 tries to switch off. Inductor 157 rings to provide a negative-going spike 169 at the emitter of transistor 151. This negative-going spike prevents transistor 151 from cutting off, and the spike will be coupled through transistor 151 to video amplifier 21 wherefrom it is coupled to the cathode-ray tube 23. This pulse causes cathode-ray tube 23 to become unblanked during horizontal retrace causing one or more bright spots to appear on the screen thereof. These bright spots appear as flashed of light to the viewer and are accordingly undesired. Diode 160 suppresses spike 169 thereby preventing spike 169 from deleteriously affecting the operation of the receiver.

Diode 160 provides another advantage where considerable high level noise is present. Such noise causes transistor 159 to turn off, but if the noise is especially severe, transistor 159 may be affected by inductor 157, especially transistor 159 is turning on and off rapidly. Diode 160 provides a shunt around inductor 157 to enhance the operation of transistor 159.

Thus, there has been provided improved AGC and sync separator circuitry having high noise immunity yet of relatively simple design, 'thereby providing highly reliable and economical circuit construction and operation. This circuitry is readily adaptable for use in low level video signal systems, for example, in receivers using solid-state RF and IF stages.

While there have been shown and described what are at present considered the preferred embodiments of the invention, it will be obvious to those skilled in the art that various changes and modifications may be made therein without departing from the scope of the invention as defined by the appended claims.

I claim:

1. In a television receiver adapted to process a composite video signal including synchronizing pulses wherein said composite video signal may also include random noise signals, improved synchronizing pulse separator circuitry comprising:

a semiconductor device having input, output and control electrodes;

means connected to the output electrode of said semiconductor device operative to couple separated synchronizing pulses to the synchronizing control of said television receiver;

biasing means connected to the control electrode of said semiconductor device operative to maintain said semiconductor device nonconducting absent signal levels less than established synchronizing pulse levels and conducting in saturation for signal levels greater than established synchronizing pulse levels, said biasing means including capacitive means connected in circuit with said control electrode for charging in response to current drawn by said control electrode to establish a bias related to the amount of current drawn by said control electrode during conduction of said semiconductor device;

means connected to said capacitive means for coupling the composite video signal to the control electrode of said semiconductor device; and frequency-dependent means connected in series with the input electrode of said semiconductor device, operative to provide increased impedance to high frequency noise signals at the control electrode of said semiconductor device yet having negligible effect on synchronizing pulses appearing at said control electrode.

2. The invention according to claim 1 wherein said semiconductor device having input, output, and control electrodes is a transistor having emitter, collector and base electrodes, respectively.

3. The invention according to claim 2 additionally comprising:

a second transistor having base, collector and emitter electrodes, wherein said frequency-dependent impedance means is connected in series between the collector electrode of said second transistor and the emitter electrode of said first transistor;

means coupling the composite video signal to the base electrode of said second transistor, the polarity of the composite video signal applied to the base electrode of said second transistor being opposite to the polarity of the composite video signal applied to the base electrode of said first transistor; and biasing means connected to the base electrode of said second transistor operative to maintain said second transistor conducting in saturation for signals less than a predetermined level and cutoff for signals exceeding said predetermined level.

4. The invention according to claim 2 wherein said frequency-dependent impedance means is an inductor.

5. The invention according to claim 2 additionally comprising diode connected in series with said frequency-dependent impedance means.

6. The invention according to claim 1 additionally comprising a means for suppressing ringing of said frequency-dependent impedance means connected to said frequency-dependent impedance means.

7. The invention according to claim 3 additionally comprising a diode connected in parallel with said frequency-dependent impedance means.

8. The invention according to claim 4 wherein a means for suppressing ringing of said inductor is connected to said inductor.

9. The invention according to claim 8 wherein said means for suppressing ringing of said inductor is a diode connected in parallel with said inductor.

10. The invention according to claim 5 additionally comprising a diode connected in parallel with said frequency-dependent impedance means.

PO-1050
(5/69)

UNITED STATES PATENT OFFICE
CERTIFICATE OF CORRECTION

Patent No. 3,609,232 Dated September 28, 1971

Inventor(s) Joseph Edward Thomas

It is certified that error appears in the above-identified patent and that said Letters Patent are hereby corrected as shown below:

Column 2, line 70 of the specification "delay" should read--display--.

Column 3, line 59 "are" should read--at--.

Column 3, line 69 "form"should read--from--.

Column 4, line 14 please delete "connected" in the first instance.

Column 4, line 54 "form" should read--from--.

Column 4, line 55 "45" should read--95--.

Column 5, line 46 "flashed" should read--flashes--.

Column 5, line 53 "especially transistor" should read--especially where transistor--.

Column 6, Claim 1, line 10 "absent" should read--for--.

Column 6, Claim 1, line 22 "dependent means" should read--dependent impedance means--.

Column 6, Claim 5, line 53 "comprising diode" should read--comprising a diode--.

Signed and sealed this 25th day of April 1972.

(SEAL)
Attest:

EDWARD M.FLETCHER,JR.
Attesting Officer

ROBERT GOTTSCHALK
Commissioner of Patents